(12) United States Patent
Chen

(10) Patent No.: US 6,301,749 B1
(45) Date of Patent: Oct. 16, 2001

(54) SCOOTER HAVING FOLDABLE HAND GRIPS

(76) Inventor: Ching Chiuan Chen, 7F, No. 46, Pin Ho 10 Street, Chang Hua (TW), 500

( * ) Notice: Subject to any disclaimer, the term of this patent is extended or adjusted under 35 U.S.C. 154(b) by 0 days.

(21) Appl. No.: 09/548,386

(22) Filed: Apr. 11, 2000

(51) Int. Cl.$^7$ .................................................. B62K 15/00
(52) U.S. Cl. .......................... 16/429; 16/427; 280/655.1; 280/278; 403/374.5; 403/353
(58) Field of Search .............................. 16/429, 421, 422, 16/427, 114.1, 405, 406; 280/655.1, 278; 403/374.2, 374.5, 353, 220, 100, 101, 102, 287, 276, 279; 74/551.1

(56) References Cited

U.S. PATENT DOCUMENTS

| | | | |
|---|---|---|---|
| 3,404,427 | * | 10/1968 | Mack ..................................... 16/427 |
| 4,296,940 | * | 10/1981 | Herbert ................................ 280/278 |
| 4,417,745 | * | 11/1983 | Shomo ................................. 280/287 |
| 4,611,818 | * | 9/1986 | Cammarata .......................... 280/278 |
| 4,634,138 | * | 1/1987 | Fryer et al. ........................... 280/278 |
| 4,761,014 | | 8/1988 | Huang . |
| 4,786,070 | * | 11/1988 | Adee .................................... 280/281 |
| 4,911,458 | * | 3/1990 | Lin et al. .............................. 280/278 |
| 5,193,834 | * | 3/1993 | Strozyk ................................. 280/278 |
| 5,351,984 | * | 10/1994 | Cheng .................................. 280/655 |
| 5,388,659 | * | 2/1995 | Pepe ..................................... 180/219 |
| 6,158,751 | * | 12/2000 | Wu et al. ......................... 280/87.041 |
| 6,173,976 | * | 1/2001 | Lee .................................... 280/87.05 |

\* cited by examiner

*Primary Examiner*—Lynne H. Browne
*Assistant Examiner*—Mark Williams

(57) ABSTRACT

A handle device includes a tube, a seat secured to the tube and having a channel for slidably receiving one end of one or more hand grips. The hand grips each has a slot for slidably receiving a fastener which is engaged through the hand grips and for allowing the hand grips to be folded to a compact folding position. The fastener has a neck engageable into the hand grip for solidly securing the hand grips to the seat. A bar is engaged onto the hand grip, and a quick release fastener is engaged through the bar and secured to the seat for clamping the bar to the hand grip.

9 Claims, 2 Drawing Sheets

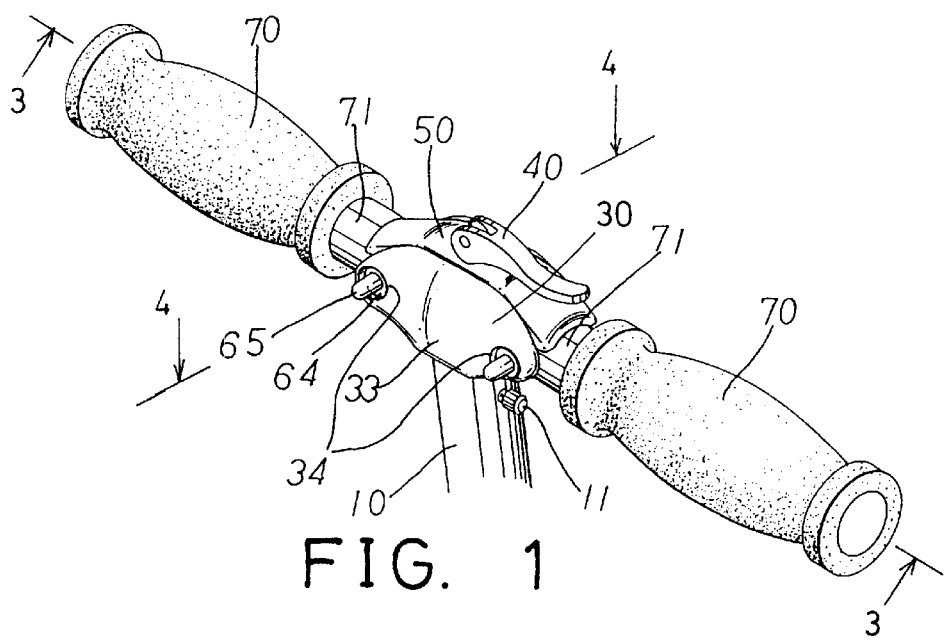
FIG. 1
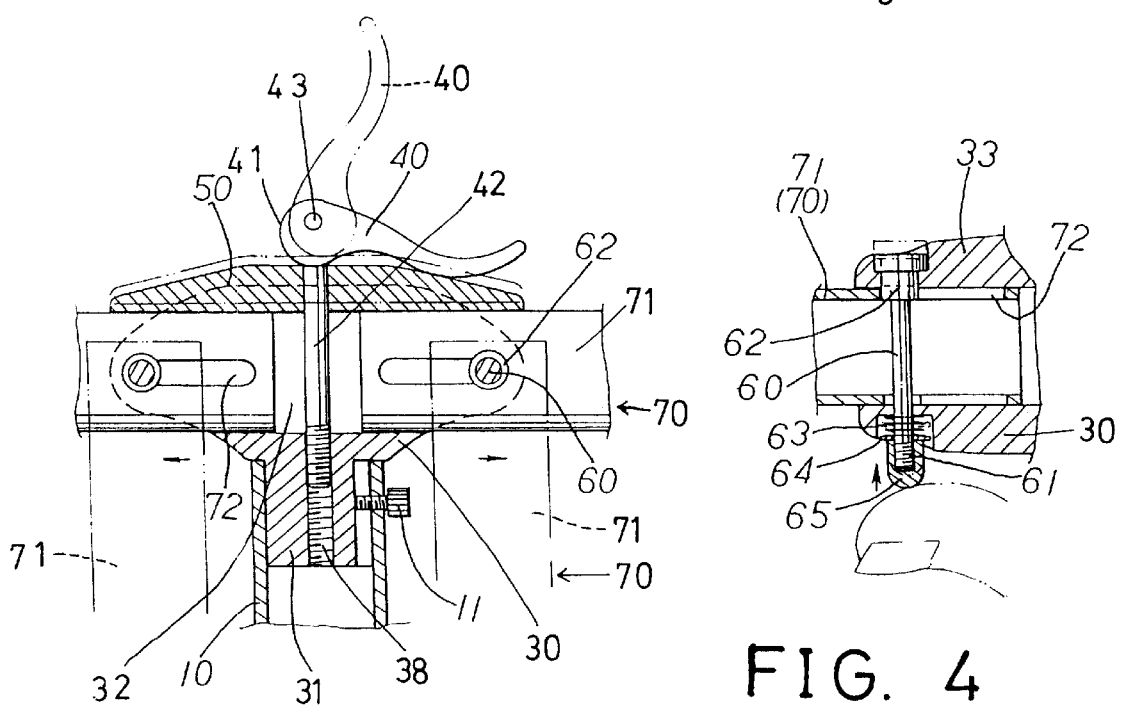
FIG. 3
FIG. 4

SCOOTER HAVING FOLDABLE HAND GRIPS

BACKGROUND OF THE INVENTION

1. Field of the Invention

The present invention relates to a scooter, and more particularly to a scooter having one or more foldable hand grips.

2. Description of the Prior Art

U.S. Pat. No. 4,761,014 to Huang discloses a typical scooter having a hand grip solidly provided on top of the handle tube and may not be folded relative to the handle tube such that the scooters may not be folded to a compact configuration. Some of the scooters comprise a handle tube which may be folded relative to the scooter body. But, the hand grips also may not be folded relative to the handle tube.

The present invention has arisen to mitigate and/or obviate the afore-described disadvantages of the conventional scooter hand grips.

SUMMARY OF THE INVENTION

The primary objective of the present invention is to provide a scooter including one or more hand grips foldable relative to the handle tube to a compact folded configuration.

In accordance with one aspect of the invention, there is provided a handle assembly comprising a handle tube including a first end, a seat secured to the first end of the handle tube and including a channel formed therein, at least one first fastener secured to the seat and engaged through the channel of the seat, at least one hand grip including a first end slidably engaged in the channel of the seat and including at least one slot formed therein for slidably receiving the first fastener, and means for clamping the first end of the hand grip to the seat. It is preferable that the handle assembly includes a pair of hand grips which may be evenly and solidly secured to the seat with the clamping means.

The handle tube includes a bore formed in the first end thereof, the seat includes an extension engaged into the bore of the handle tube. The extension of the seat includes a notch formed therein, and a second fastener engaged through the handle tube and engaged into the notch of the extension of the seat for securing the seat to the handle tube and for preventing the seat from rotating relative to the handle tube.

The hand grip includes at least one orifice formed therein and communicating with the slot thereof, the orifice of the hand grip includes a size greater than that of the slot of the hand grip, the first fastener includes a neck engageable into the orifice of the hand grip for securing the hand grip to the seat. A spring biasing device is further provided for biasing the neck of the first fastener to engage into the orifice of the hand grip. The hand grip may be slided relative to the seat and may be rotated to engage with the handle tube to a compact folded position.

The clamping means includes a quick release device for securing the first end of the hand grip to the seat. The quick release device includes a clamping bar engaged onto the first end of the hand grip, a second fastener engaged through the clamping bar and secured to the seat, and means for forcing the clamping bar to the hand grip. The forcing means includes a lever having a cam pivotally secured to the second fastener, the cam is engaged and forced against the clamping bar when the lever is rotated relative to the second fastener. The clamping bar includes a curved recess formed therein for receiving the first end of the hand grip and for solidly securing said hand grips to the seat.

Further objectives and advantages of the present invention will become apparent from a careful reading of a detailed description provided hereinbelow, with appropriate reference to accompanying drawings.

BRIEF DESCRIPTION OF THE DRAWINGS

FIG. 1 is a perspective view of handle assembly for a scooter in accordance with the present invention;

FIGS. 3 and 4 are partial cross sectional views taken along lines 3—3 and 4—4 of FIG. 1 respectively.

DETAILED DESCRIPTION OF THE PREFERRED EMBODIMENT

Figure 2:
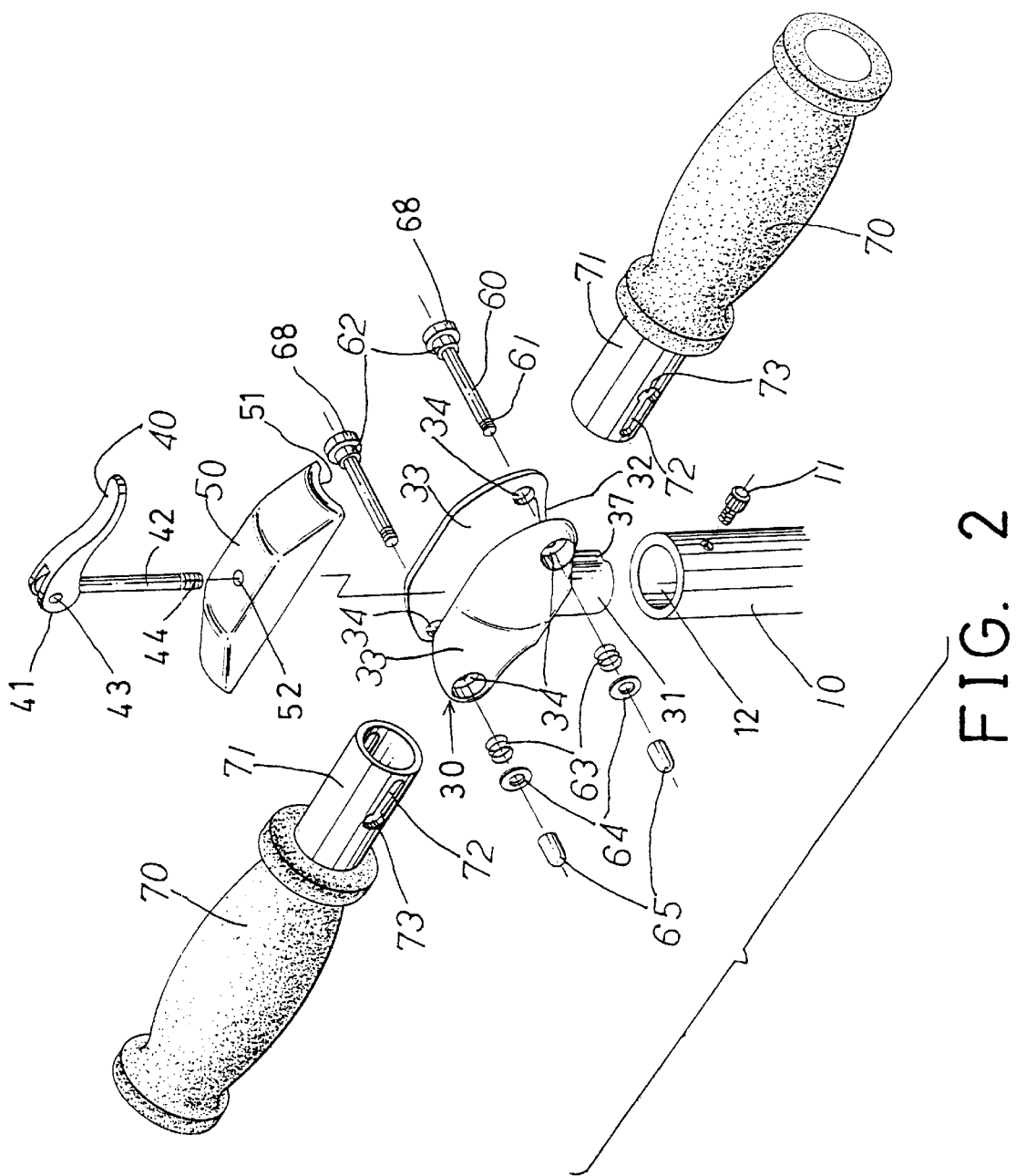
FIG. 2 is an exploded view of the handle assembly.

Referring to the drawings, and initially to FIGS. 1 and 2, a handle assembly in accordance with the present invention is provided for a scooter which includes a scooter body having two typical wheels attached thereto. The handle assembly may be folded relative to the scooter body. However, the configuration of the scooter body and the attachment or the folding mechanism of the handle assembly to the scooter body are not relative to the present invention and will not be described in further details. U.S. Pat. No. 4,761,014 to Huang discloses a typical scooter which may be taken as a reference to the present invention.

The handle assembly comprises a handle tube 10 including a bore 12 formed therein. A fastener 11, such as a screw or a bolt 11, is threaded through the upper portion of the handle tube 10 and engaged into the bore 12 of the handle tube 10. A seat 30 includes an extension 31 extended downward therefrom and slidably engaged into the handle tube 10 and having a groove or a notch 37 formed therein for receiving the fastener 11 which may secure the extension 31 of the seat 30 to the handle tube 10 and which may prevent the seat 30 from rotating relative to the handle tube 10. The seat 30 includes a channel 32 formed therein and defined by a pair of opposite panels 33. The panels 33 each includes two ends each having a stepped hole 34 formed therein.

A pair of hand grips 70 each includes one end 71 extendibly and slidably received in the channel 32 of the seat 30 and each includes one or a pair of slots 72 formed therein and each includes one or a pair of orifices 73 formed therein and communicating with the slots 72 respectively. For example, when the ends 71 of the hand grips 70 include a solid structure, the hand grips 70 each includes only one slot 72 and only one orifice 73 formed therein and communicating with each other. The orifices 73 includes a size or a diameter greater than the width of the slots 72 of the hand grips 70. A pair of fasteners 60 are engaged through the stepped holes 34 of the seat 30 and extended through the channel 32 of the seat 30 and engaged through the slots 72 and the orifices 73 of the hand grips 70 for securing the hand grips 70 to the seat 30. The hand grips 70 may be pulled outward relative to the seat 30 and may be folded about the fasteners 60 respectively for allowing the hand grips 70 to be folded to a compact folded position parallel to the handle tube 10, as shown in dotted lines in FIG. 3.

The fasteners 60 each includes a head 68 and a neck 62 formed on one end thereof and each includes an outer thread 61 formed on the other end thereof for threading with a nut 65 of the like. The heads 68 of the fasteners 60 are greater in diameter than that of the stepped holes 34 of the seat 30 such that the fasteners 60 will not be disengaged from the seat 30. The necks 62 of the fasteners 60 have a size or a diameter equals to or smaller than that of the stepped holes 34 of the seat 30 for engaging through the stepped holes 34 of the seat 30, and has a size or diameter greater than that of the slots 72 but no greater than that of the orifices 73 such that the necks 62 may not be engaged through the slots 72 of the hand grips 70 but may be engaged through the orifices 73 of the hand grips 70. A spring 63 and a washer 64 are engaged on the other end of each of the fasteners 60 and engaged between the seat 30 and the nuts 65 respectively. The springs 63 may bias the necks 62 of the fasteners 60 to engage into the orifices 73 of the hand grips 70 for securing the hand grips 70 to the seat 30 (FIG. 4). The necks 62 of the fasteners 60 may be disengaged from the orifices 73 of the hand grips 70 when the fasteners 60 are depressed against the springs 63 (FIG. 4).

A clamping device includes a clamping bar 50 engaged on the ends 71 of the hand grips 70. The clamping bar 50 is preferably engaged into the channel 32 of the seat 30, but is not necessarily be engaged into the channel 32 of the seat 30. It is only required that the clamping bar 50 is engaged onto the hand grips 70, particularly the ends 71 of the hand grips 70. The clamping bar 50 preferably includes one or more curved recesses 51 (FIG. 2) formed therein for receiving the ends 71 of the hand grips 70 and for solidly engaging onto the hand grips 70. The clamping device further includes a quick release fastener having a lever 40 and having a cam 41 formed or provided on one end of the lever 40 and pivotally secured to a fastener 42 at a pivot pin 43. The fastener 42 includes the other end having an outer thread 44 formed thereon for threading with an inner thread or a screw hole 38 of the seat 30 (FIG. 3) and for securing to the seat 30. The fastener 42 is engaged through a hole 52 of the clamping bar 50.

In operation, as shown in FIG. 3, the cam 41 is arranged to force the clamping bar 50 downward to solidly engage with the ends 71 of the hand grips 70 and to solidly secure the hand grips 70 to the seat 30 when the lever 40 is folded or rotated downward to engage with the clamping bar 50, as shown in solid lines in FIG. 3. When the lever 40 is rotated away from the clamping bar 50, as shown in dotted lines in FIG. 3, the cam 41 may release the clamping bar 50 and the clamping bar 50 may be slightly moved away from the ends 71 of the hand grips 70 such that the hand grips 70 may be moved relative to the clamping bar 50 and the seat 30 and such that the hand grips 70 may then be rotated to the folded position as shown in dotted lines in FIG. 3.

It is to be noted that the handle assembly may include only one hand grip 70 to be detachably secured to the seat 30 with the clamping bar 50 and the clamping lever 40 of the clamping device. But, it is preferable that a pair of hand grips 70 are provided such that the hand grips 70 may be solidly secured to the seat 30.

Accordingly, the scooter in accordance with the present invention includes one or more hand grips foldable relative to the handle tube to a compact folded configuration.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A handle assembly comprising:
a handle tube including a first end,
a seat secured to said first end of said handle tube and including a channel formed therein,
at least one first fastener secured to said seat and engaged through said channel of said seat,
at least one hand grip including a first end slidably engaged in said channel of said seat and including at least one slot formed therein for slidably receiving said at least one first fastener, and
means for clamping said first end of said at least one hand grip to said seat, said clamping means including a clamping bar engaged onto said first end of said at least one hand grip, a second fastener engaged through said clamping bar and secured to said seat, and means for forcing said clamping bar to said at least one hand grip.

2. The handle assembly according to claim 1, wherein said handle tube includes a bore formed in said first end thereof, said seat includes an extension engaged into said bore of said handle tube.

3. The handle assembly according to claim 2, wherein said extension of said seat includes a notch formed therein, and a second fastener engaged through said handle tube and engaged into said notch of said extension of said seat for securing said seat to said handle tube and for preventing said seat from rotating relative to said handle tube.

4. The handle assembly according to claim 1, wherein said at least one hand grip includes at least one orifice formed therein and communicating with said at least one slot thereof, said at least one orifice of said at least one hand grip includes a size greater than that of said at least one slot of said at least one hand grip, said at least one first fastener includes a neck engageable into said at least one orifice of said at least one hand grip for securing said at least one hand grip to said seat.

5. The handle assembly according to claim 4 further comprising means for biasing said neck of said at least one first fastener to engage into said at least one orifice of said at least one hand grip.

6. The handle assembly according to claim 1, wherein said forcing means includes a lever having a cam pivotally secured to said second fastener, said cam is engaged and forced against said clamping bar when said lever is rotated relative to said second fastener.

7. A handle assembly comprising:
a handle tube including a first end,
a seat secured to said first end of said handle tube and including a channel formed therein,
at least one first fastener secured to said seat and engaged through said channel of said seat,
at least one hand grip including a first end slidably engaged in said channel of said seat and including at least one slot formed therein for slidably receiving said at least one first fastener, and
means for clamping said first end of said at least one hand grip to said seat, said clamping means including a quick release device for securing said first end of said at least one hand grip to said seat, said quick release device including a clamping bar engaged onto said first end of said at least one hand grip, a second fastener engaged through said clamping bar and secured to said seat, and means for forcing said clamping bar to said at least one hand grip.

8. The handle assembly according to claim 7, wherein said forcing means includes a lever having a cam pivotally secured to said second fastener, said cam is engaged and forced against said clamping bar when said lever is rotated relative to said second fastener.

9. The handle assembly according to claim 7, wherein said clamping bar includes a curved recess formed therein for receiving said first end of said at least one hand grip.

* * * * *